United States Patent [19]
Goates

[11] Patent Number: 5,513,732
[45] Date of Patent: May 7, 1996

[54] REGULATION OF HYDRAULIC PRESSURE IN A SYSTEM HAVING MULTIPLE PRESSURE SOURCES

[75] Inventor: Eldon L. Goates, Livonia, Mich.

[73] Assignee: Ford Motor Company, Dearborn, Mich.

[21] Appl. No.: 286,566

[22] Filed: Aug. 5, 1994

[51] Int. Cl.$^6$ ............................. F16H 61/14; F04B 23/04
[52] U.S. Cl. ............................. 192/3.3; 192/85 R; 60/486
[58] Field of Search ...................... 192/3.29, 3.3, 192/3.33, 85 R; 60/421, 428, 486; 417/287, 428

[56] References Cited

U.S. PATENT DOCUMENTS

| | | |
|---|---|---|
| 2,599,701 | 6/1952 | Eames . |
| 2,642,516 | 6/1953 | Carlson . |
| 3,385,312 | 5/1968 | Kinnamon et al. . |
| 3,535,877 | 10/1970 | Becker et al. . |
| 3,953,153 | 4/1976 | Huber ............................ 417/428 X |
| 4,089,166 | 5/1978 | Ratliff et al. . |
| 4,152,894 | 5/1979 | Rumyantsev et al. ............... 192/3.3 X |
| 4,213,511 | 7/1980 | Rubenstein et al. . |
| 4,514,147 | 4/1985 | Borman et al. ..................... 60/421 X |
| 4,819,430 | 4/1989 | Becker . |
| 5,081,837 | 1/1992 | Ueno . |
| 5,165,862 | 11/1992 | Lindblom . |

Primary Examiner—Richard M. Lorence
Attorney, Agent, or Firm—Frank G. McKenzie; Roger L. May

[57] ABSTRACT

A bypass pressure regulator valve, having first and second regulator ports connected to a sump and each port supplied from the output side of a first and second pump, regulates the magnitude of line pressure in response to a control pressure produced by a variable force solenoid. A high pump feed select valve alternately connects the output of the first pump and the sump to the inlet of the second pump. Output from the first pump is directed through a torque converter clutch pressure regulator valve and a converter charge pressure regulator valve to a first inlet of the torque converter causing the torque converter to open and to a second inlet causing the torque converter to close. Hydraulic fluid is directed to lubrication circuits and through a transmission oil cooler.

15 Claims, 4 Drawing Sheets

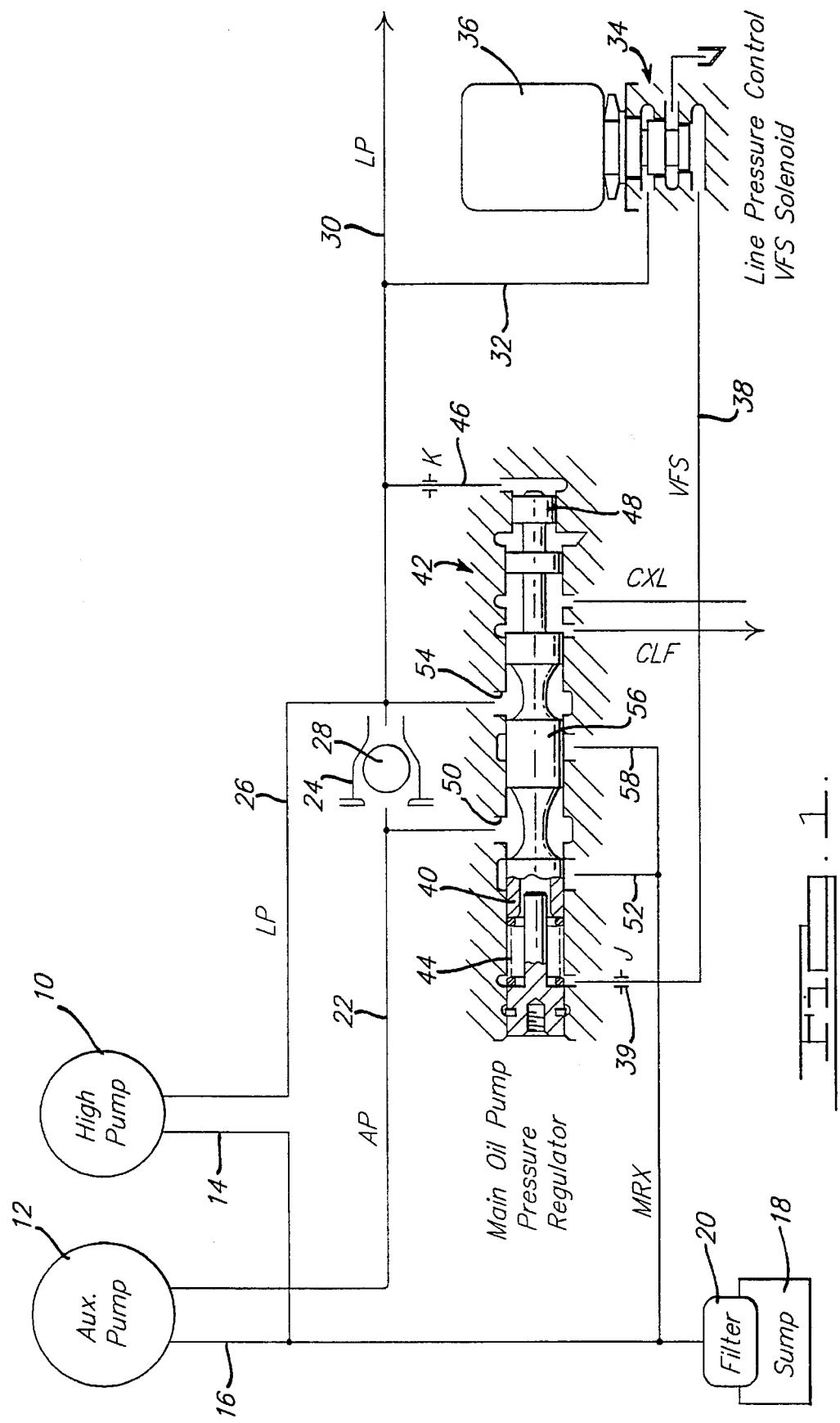

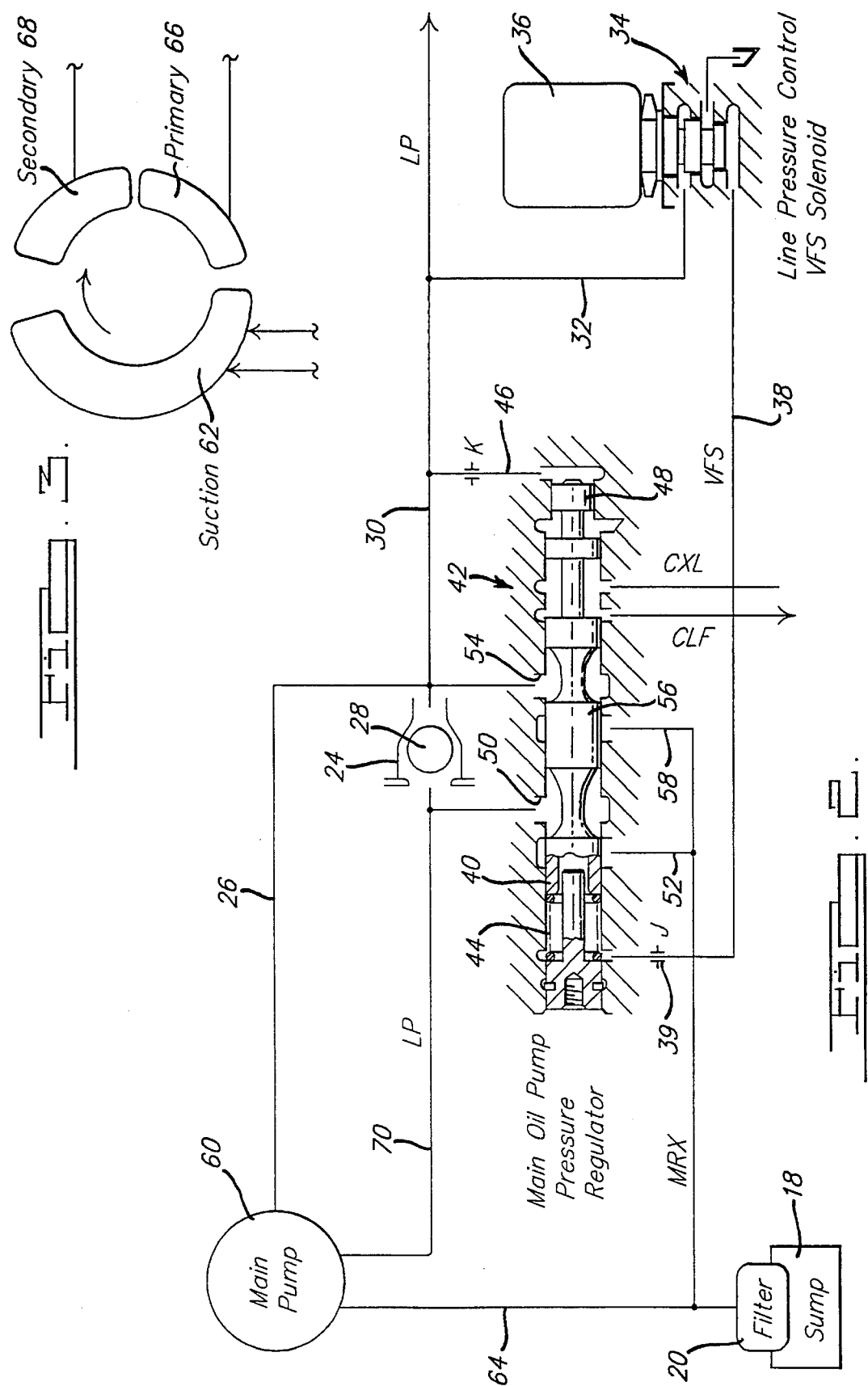

5,513,732

REGULATION OF HYDRAULIC PRESSURE IN A SYSTEM HAVING MULTIPLE PRESSURE SOURCES

BACKGROUND OF THE INVENTION

1. Field of the Invention

This invention relates to the field of control and actuation of automatic transmissions for motor vehicles. More particularly, the invention pertains control of pressure in an hydraulic system supplied from multiple hydraulic pumps.

2. Description of the Prior Art

Conventionally, hydraulic systems of automatic transmissions have conventionally been supplied with hydraulic fluid drawn from a sump by a fixed displacement pump. Pumps of this kind are selected so that they produce sufficient flow to match the requirements of the hydraulic system at low speed, generally at the idle speed of the engine. At higher speed, the pump produces flow greatly in excess of the requirements of the hydraulic system. Excess flow is diverted directly to the sump causing low operating efficiency of the system. To avoid this difficulty, variable displacement pumps have been substituted for the fixed displacement pumps so that the flow capacity of the pump matches the pump speed. Difficulty has been experienced in controlling instability of variable displacement pumps in this operating environment.

The flow rate of hydraulic fluid supplied to the hydraulic circuit of an automatic transmission depends on many factors and varies in magnitude over a wide range. Fluid is used throughout the transmission to fill and engage friction clutches and brakes, and for lubrication. Pressure for this fluid is maintained at line pressure by a main regulator valve that responds to the magnitude of a control pressure. Except at low speed and under transient conditions, the required volume of fluid at line pressure is typically less than 40% of the pump capacity; therefore, 60% of the work done by the pump can be wasted. Multiple pumps provide a way to decrease these losses by shutting off one pump when flow requirements permit.

Multiple fixed displacement pumps have been combined to supply hydraulic fluid to the hydraulic system of an automatic transmission, one of the pumps having a high displacement and the other a lower displacement. It is necessary that line pressure be regulated uniformly, regardless of whether the circuit is supplied from one or both pumps concurrently.

Cavitation is a condition in which the available fluid at a pump inlet is insufficient to fill the inlet or pumping chambers. Bubbles produced by cavitation implode as they are exposed to system pressure at the outlet of the pump. The condition is the result of excess pump speed, restriction in the inlet line, low level of fluid in the sump or reservoir, or high oil viscosity.

The maximum vacuum at the inlet of a pump should be no more than five inches Hg. Ideally, there should be no vacuum, or even a slight positive pressure, at the inlet; otherwise, cavitation can occur. Cavitation causes erosion of the metal within the pump and speeds deterioration of the hydraulic fluid. A cavitated pump makes a very distinctive noise as the bubbles implode under pressure.

One way to avoid cavitation is to pressurize the pump inlet such as by locating the reservoir sump above the pump. However, in an automatic transmission, this location of these components is difficult to accomplish. An auxiliary pump can be used to maintain the supply of oil to the inlet at low pressure.

SUMMARY OF THE INVENTION

An object of the present invention is to provide a control that employs one spool valve and a check valve to provide line pressure regulation and pump circuit control for an hydraulic circuit having two pumps for drawing fluid from a sump.

Another object of this invention is to provide a pressure regulation in a dual pump system that directs excess fluid to a torque converter bypass clutch apply-and-release circuit and to lubrication circuits.

Use of a single regulator valve to control multiple pressure sources enhances hydraulic stability and minimizes the number of parts required to accomplish these objectives. Supercharging increases the efficiency of a dual pump system and decreases cavitation during high speed operation.

To realize these advantages and objects a pressure regulator for controlling pressure in fluid supplied to a hydraulic circuit from first and second pumps, includes a source of control pressure, a source of bypass clutch control pressure, and a check valve connected to the circuit, connecting the pump outlets, and permitting flow from the first pump through the check valve but preventing flow from the second pump through the check valve. A pressure regulator valve connected to the control pressure source has a first port communicating with the outlet of the first pump and circuit, through which first port a connection to an exit line is opened and closed in response to control pressure. The pressure regulator valve includes a second port communicating with the outlet of the second pump, check valve and circuit, through which second port a connection to an inlet is opened and closed in response to control pressure. The regulator includes an clutch apply line and clutch release line.

A bypass clutch valve is connected to the exit line, circuit, source of bypass clutch control pressure, clutch apply line, and clutch release line. The bypass clutch valve responds to bypass clutch control pressure to connect the exit line to the clutch release line and to connect alternately the circuit to the clutch apply line.

In one embodiment of the invention a feed select valve, connected to the pump inlets and outlets, responds to a difference in pressure at the outlets of the first and second pumps to connect the outlet of the first pump to the inlet of the second pump when the pressure at the outlet of the first pump is relatively low, and to connect the inlet of the first pump to the inlet of the second pump when the pressure at the outlet of the first pump is relatively high.

In another embodiment of the invention the pressure regulator supplies regulated pressure to a torque converter having a bypass clutch. A lubrication line connects the bypass clutch valve and a lube circuit, and the bypass clutch valve including means for connecting the lubrication line means and clutch apply line when the bypass clutch valve connects the exit line to the clutch release line.

A lubrication line connects the bypass clutch valve and a lube circuit, and the bypass clutch valve includes means for connecting the lubrication line and the exit line when the bypass clutch valve connects the circuit to the clutch apply line.

BRIEF DESCRIPTION OF THE DRAWINGS

FIG. 1 is a schematic diagram showing an arrangement of pumps and a pressure regulator according to this invention.

FIG. 2 a schematic diagram showing a pressure regulating valve according to this invention used in combination with a single main pump having two outlets.

FIG. 3 is a cross section showing an arrangement of inlet and outlet ports for the main pump of FIG. 2.

DESCRIPTION OF THE PREFERRED EMBODIMENT

Figure 4:
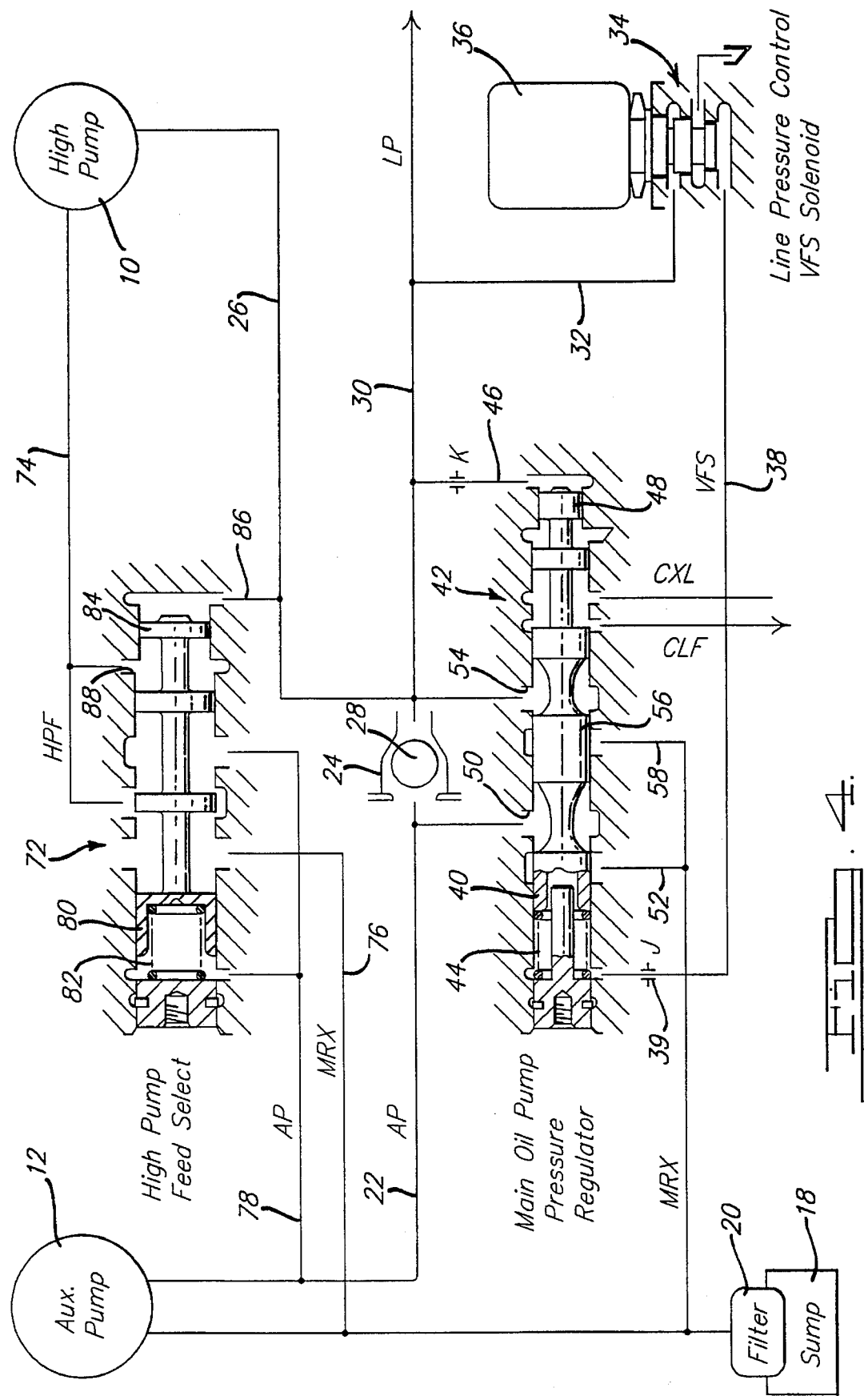
FIG. 4 is a schematic diagram showing an arrangement of two pumps, a regulator valve, and a high pump feed selective valve.

Referring first to FIG. 1, an hydraulic system includes two pumps: a high pump 10, preferably a fixed displacement oil pump of smaller displacement, and an auxiliary pump 12, a larger fixed displacement oil pump. The pump inlets 14, 16 are connected mutually to a low pressure sump 18, from which hydraulic fluid is drawn through a filter 20. The output of pump 12 is connected through line 22 to a check valve 24, and the output of pump 10 is connected by line 26 to the opposite side of check valve 24. The check valve includes a floating ball seal 28, which moves within the chamber of the check valve in response to differential pressure across the valve between a position at the left-hand side where ball 28 closes line 22 against the passage of fluid and a position at the right-hand side where lines 22 and 26 communicate through valve 24.

The hydraulic circuit that controls and actuates the components of an automatic transmission is supplied with fluid at line pressure through circuit feed line 30, which line is connected through line 32 to a line pressure control valve 34, operated by a variable force solenoid 36. Control pressure, VFS pressure, carried in line 38 through an orifice 39, develops a pressure force on a control land 40 of a main oil pressure regulator valve 42. The control pressure force on land 40 and the force of spring 44 operate against the effect of feedback line pressure, carried in line 46 to land 48 of the spool of valve 42. The outlet or discharge side of pumps 10, 12 communicate with the chamber of valve 42 through lines 26, 22, respectively.

In operation, when the circuit flow rate requirements at line pressure are large, line pressure is regulated at a first regulating port 50. Valve 42 regulates pressure in line 30 by opening and closing a connection between port 50 and line 52 in response to the relative magnitudes of pressure forces developed by feedback line pressure carried in line 46 to valve 42 and the opposing forces of the spring 44 and VFS pressure. Line 52 is connected to sump 18 and the suction side of pump 12. The hydraulic circuit of the automatic transmission is supplied with fluid carried in line 30 and 26 from the output side of high pump 10, and additional fluid is supplied to feed line 30 through check valve 24 and line 22 from the output side of pump 12. When valve 42 regulates line pressure at the first port 50, the second port 54 is closed because land 56 closes the connection between line 58 and the valve chamber.

As flow from pump 10 becomes greater than the line pressure requirements of the circuit, the spool of valve 42 moves leftward from the position shown in FIG. 1 so that land 56 opens a connection between port 54 and 58 and closes that connection in response to the magnitude of feedback pressure in line 46, the force of spring 44, and the force of VFS pressure on land 40. With the valve in this second stage of regulation where regulation occurs at port 54, port 50 is continually open to low pressure through line 52. The resulting flow from pump 12 to exhaust causes a large pressure drop across the auxiliary pump 12 and shuttles the check valve 24 to a closed position. Line pressure regulation then continues at the second regulating port 54.

When the line pressure circuit flow requirement exceeds the flow provided by high pump 10, the spool of regulator valve 42 moves rightward, sealing second regulating port 54, AP circuit pressure rises to line pressure, check valve 24 unseats, and line pressure once again is regulated at the first regulating port 50.

The circuit of FIG. 2 is similar to that of FIG. 1, except that high pump 10 and auxiliary pump 12 are replaced by a main pump 60. FIG. 3 shows the arrangement of a suction port 62, which is connected by line 64 to the sump and lines 52 and 58 from regulator valve 42, a primary outlet 66 and secondary outlet 68 of the main pump 60. The secondary outlet is connected by line 70 to check valve 24 and regulator valve 42. Primary outlet 66 is connected by line 26 to valve 42, line 30, and check valve 24. Pump 60 may be a vane pump, a GEROTOR pump, a gear pump, or an equivalent of these.

Two outlet ports 66, 68 of pump 60 essentially replace the outlets of high pump 10 and auxiliary pump 12. Regulation of line pressure is accomplished as described above with reference to FIG. 1.

FIG. 4, an enhancement of the circuits of FIG. 1, improves efficiency by adding a high pump feed select valve 72, which switches the high pump inlet line 74 from a connection to sump, as in FIG. 1, to the outlet line 78 of the auxiliary pump, under certain conditions.

Feed select valve 72 includes a valve spool having several control lands, including land 80 on which a pressure force resulting from pressure at the discharge side of the auxiliary pump 12 carried in line 78 is developed in addition to the force of spring 82. Feedback line pressure, carried in lines 26 and 86 to a control land 84, develops a control pressure force in opposition to the spring force and AP pressure force on land 80. The suction side of high pump 10 is connected through line 74 to a port 88 so that a differential pressure is developed on the spool of valve 72 in proportion to pressure in line 74. Therefore, valve 72 is continually connected by line 76 to the sump and by line 78 to the discharge side of the auxiliary pump. Valve 72 alternately connects lines 76 and 78 to line 74.

In operation, when pressure in line 78 is approximately equal to the pressure in line 26, the spool of valve 72 moves rightward from the position shown in FIG. 4, thereby closing the connection between line 78 and line 74 and opening a connection between line 76 and line 74. With valve 72 is this first state, sump 18 is directly connected to the inlet of high pump 10 and the output of auxiliary pump 12 is connected only to check valve 24 and pressure regulator valve 42.

When pressure in line 78 drops substantially in relation to the pressure in line 26, the spool of feed select valve 72 moves leftward from the position shown in FIG. 4, thereby opening a connection between line 74 and line 78 and closing a connection between line 74 and line 76, and the pump 12 supercharges pump 10. In other respects, the circuit of FIG. 4 functions identically as those of FIGS. 1 and 2.

Figure 5:
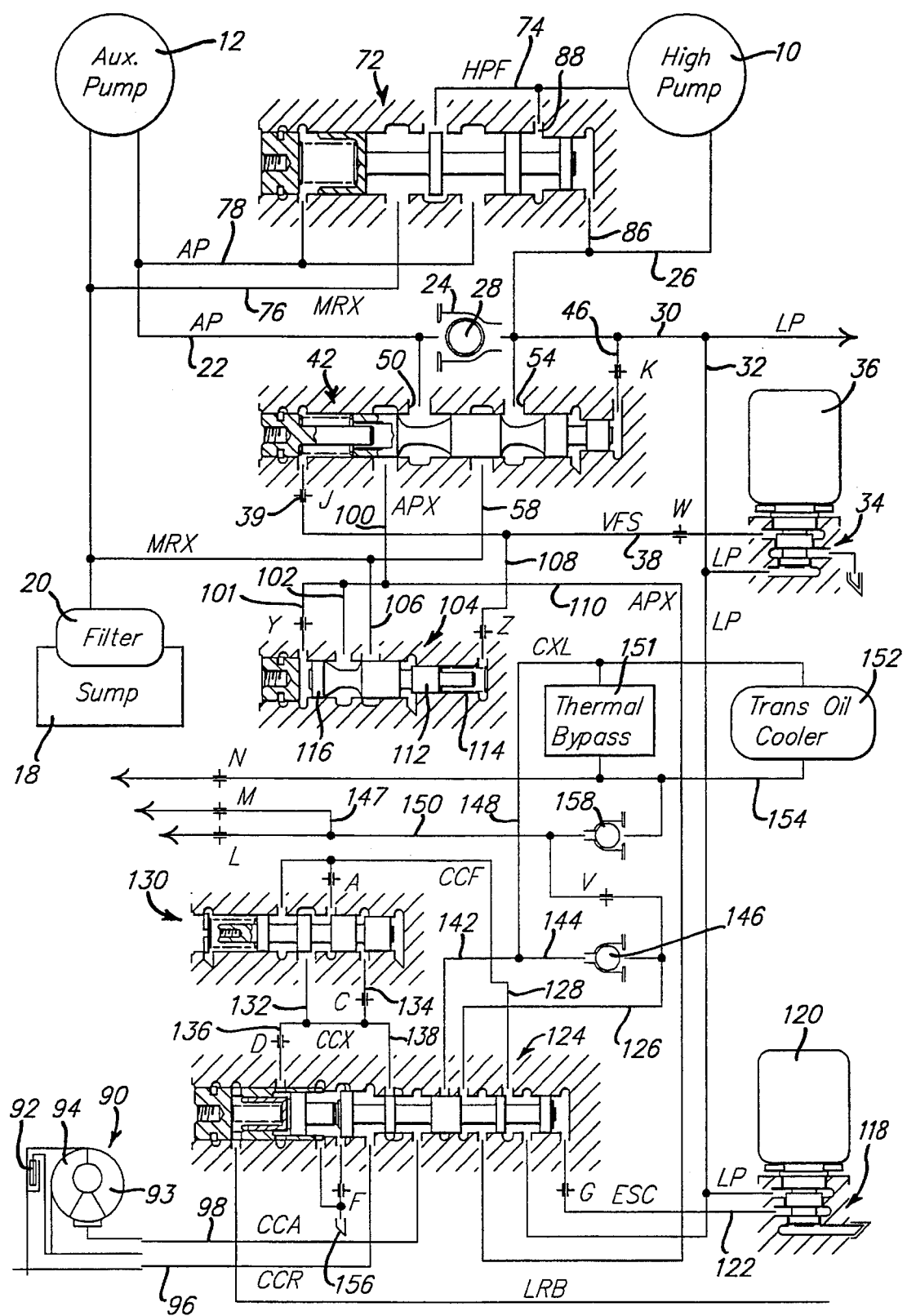
FIG. 5 is a schematic diagram showing an hydraulic circuit for regulating line pressure and controlling pressure supplied to a torque converter of an automatic transmission.

FIG. 5, an additional enhancement of the circuit of FIG. 4, includes the supercharging feature of that circuit along with use of excess flow from pump 12 for the torque converter bypass clutch and lubrication circuits. The circuit of FIG. 5 opens and closes torque converter 90, i.e., disengages and engages, alternately, the bypass clutch 92 which mechanically connects the impeller wheel 93 and the turbine wheel 94, respectively. The torque converter is open when line 96 is pressurized and closed when line 98 is pressurized.

In the circuit of FIG. 5, the first regulating port 50 of pressure regulator valve 42 is connected through exit line 100 and lines 101, 102 to a lubrication oil pressure regulator valve 104 whose exhaust port is connected through line 106 to the sump 18 and the inlet of pump 12. Control VFS pressure is connected through lines 38, 108 to a control port of regulator valve 104.

In operation, valve 104 regulates APX pressure in exit line 100, 110 by alternately opening and closing a connection between vent line 106 and exit line 110 in response to the VFS control pressure force developed on control land 112, the force of spring 114, and a pressure force on land 116. Exit line 100, 110 is connected to a port of valve 124.

Line pressure is connected through line 32 to a converter clutch control valve 118, which is operated by a variable force solenoid 120 in accordance with a variable magnitude of electrical current supplied to the solenoid. Control pressure produced by valve 118, ESC pressure, is carried on line 122 to a converter clutch pressure regulator valve 124. ESC pressure is low when the torque converter is open and high when the torque converter is closed. Regulator valve 124 is supplied with line pressure and APX pressure at ports which are opened and closed to lines 126 and 128.

A converter charge pressure regulator valve 130 is supplied with fluid from regulator valve 124 through line 128, which produces regulated CCX pressure in lines 132, 134 connected to regulator valve 124. Regulator valve 130 is a set regulator, which regulates CCX pressure above 100 psi; otherwise, valve 130 is open and CCX pressure is maintained at 100 psi or lower. CCX pressure produced by converter charge pressure regulator valve 130 is connected through lines 136 and 138 to ports of the converter clutch pressure regulator valve 124.

When the torque converter is to operate in the open condition, ECS pressure is low. This action causes the spool of regulator valve 124 to move to the right-hand end of the valve chamber, thereby opening a connection between APX pressure in exit line 110 and line 128. CCX pressure output by regulator valve 130 is connected through valve 124 to release line 96. Pressure carried in line 96 to torque converter 90 operates to remove frictional contact between the clutch surfaces of the torque converter bypass clutch 92 so that turbine 94 is driven hydrokinetically by impeller 93. With regulator valve 124 at the right-hand end of the valve chamber, hydraulic fluid is carried from the torque converter through apply line 98, through valve 124 to a lube and cooler line 142. Lubrication lines 148, 150 are arranged mutually parallel and parallel to line 154 between valve 124 and the lube circuits supplied through these lines. Hydraulic fluid in line 142 is blocked by check valve 146 and is directed instead through lubrication line 148, thermal bypass valve 151, and transmission oil cooler 152 to a third lubrication line 154. The bypass valve 151, preferably a bimetallic temperature-sensitive valve, closes a connection between lines 148 and 154 when oil temperature is high, thereby directing the entire flow through transmission oil cooler 152, and opens a connection between lines 148 and 154 when oil temperature is low, thereby bypassing oil cooler 152.

When torque converter 90 is closed, ESC pressure is high causing the spool of regulator valve 124 to move to the left-hand end of the valve chamber. With valve 124 so disposed, LP line 32 is connected to line 128. Converter charge pressure regulator valve 130 connects line 128 to lines 132, 136, and 138. Regulator valve 124 connects line 138 to apply line 98. Hydraulic fluid in line 98 forces the friction surfaces of the bypass clutch 92 into mutual frictional contact, engaging the bypass clutch and closing the torque converter. Hydraulic fluid is carried from the torque converter through reference line 96 to the regulator valve 124, through which it is directed to vent port 156.

When the spool of regulator valve 124 is at the left-hand end of the valve chamber, APX pressure in exit line 110 is directed through valve 124 to line 126, through which it is carried through check valve 146 and lines 144, 148 to the thermal bypass 151, transmission oil cooler 154 and lube line 154. Line 126 carries hydraulic fluid from valve 124 directly to the first and second lubrication lines 148, 150, but check valve 158 closes a connection between lines 126 and 154.

In the circuit of FIG. 5, the high pump provides fluid line pressure to the high pressure control system components, i.e., clutches, brakes, solenoid-operated valves, and torque converter 90. The auxiliary pump 12 provides flow at line pressure to assist the high pump 10 when the flow requirement and line pressure are greater than the capacity of the high pump. Auxiliary pump pressure is reduced when the high pump is capable of providing the required flow to the line pressure circuit. When the auxiliary pump pressure is reduced, the AP circuit supercharges inlet line 74 of the high pump through the high pump feed select valve 72.

Auxiliary pump 12 provides flow to the torque converter 90, lubrication line 148, 150, and cooler 152 when the torque converter is open. When the torque converter is closed, the auxiliary pump provides flow to the lubrication cooler circuits, and line pressure supplies fluid to the torque converter bypass clutch. The auxiliary pump exhaust pressure is regulated in a lube oil pressure regulator in response to VFS pressure. The regulated magnitude, in the example shown in FIG. 5, is 25% of line pressure plus ten psi. Hydraulic fluid from the torque converter is directed to the oil cooler and lubrication lines when the torque converter bypass clutch is disengaged. When the bypass clutch is engaged, the flow to only one of the lubrication circuits is directed also to the oil cooler. Lubrication and torque converter priority are adjusted automatically using auxiliary pump exhaust pressure when the bypass clutch is off and by line pressure when the bypass clutch is on.

Having described a preferred embodiment of my invention, what I claim and desire to secure by U.S. Letters Patent is:

1. A system for controlling circuit pressure in a hydraulic circuit, comprising:

pumping means having an inlet, a first outlet, and a second outlet;

a source of variable control pressure;

a check valve connecting the outlets, permitting flow from the first outlet therethrough and preventing flow from the second outlet therethrough; and a pressure regulator valve connected to the inlet, circuit pressure, and control pressure source having
   a first port where pressure at the first outlet is regulated by control pressure and circuit pressure, and a
   second port where pressure at the second outlet is regulated by control pressure and circuit pressure.

2. The system of claim 1, further comprising a fluid source communicating with the inlet.

3. The system of claim 1 wherein the first port is closed when pressure regulation occurs at the second port, and wherein the second port is open to and closed from the inlet when pressure regulation occurs at the first port.

4. The system of claim 1 wherein the source of variable control pressure includes:

a control valve connected to regulated pressure supplied to the circuit and pressure regulator valve; and a solenoid for changing the magnitude of pressure supplied to the pressure regulator valve from the control valve in response to the magnitude of electric current applied to the solenoid.

5. The system of claim 1 wherein the pumping means comprises a fixed displacement hydraulic pump having an inlet, a primary outlet and secondary outlet.

6. A system for controlling circuit pressure in a hydraulic circuit, comprising:

first and second pumps, each having an inlet and outlet, the outlet of the second pump connected to the circuit;

a source of variable control pressure;

a check valve connecting the outlets, permitting flow from the first pump therethrough and preventing flow from the second pump therethrough;

a feed select valve means connected to inlets and outlets, responsive to a difference in pressure at the outlets of the first and second pumps, for connecting the outlet of the first pump to the inlet of the second pump when the pressure at the outlet of the first pump is relatively low, and for connecting the inlet of the first pump to the inlet of the second pump when the pressure at the outlet of the first pump is relatively high; and a pressure regulator valve connected to the inlets, circuit pressure, and control pressure source having a first port where pressure at the first outlet of the first pump is regulated by control pressure and circuit pressure, and a second port where pressure at the outlet of the second pump is regulated by control pressure and circuit pressure.

7. The system of claim 6, further comprising a fluid source communicating with the inlets.

8. The system of claim 6 wherein the first port is closed when pressure regulation occurs at the second port, and wherein the second port is open to and closed from an inlet when pressure regulation occurs at the first port.

9. The system of claim 6 wherein the source of variable control pressure includes:

a control valve connected to regulated pressure supplied to the circuit and pressure regulator valve; and a solenoid for changing the magnitude of pressure supplied to the pressure regulator valve from the control valve in response to the magnitude of electric current applied to the solenoid.

10. A system for controlling fluid pressure supplied to a hydraulic circuit and to a torque converter having a bypass clutch, comprising:

first and second pumps, each having an inlet and outlet;

a source of control pressure;

a check valve connecting the outlets, permitting flow from the first pump therethrough and preventing flow from the second pump therethrough;

a pressure regulator valve connected to the inlets, circuit pressure and control pressure source having a first port where pressure at the outlet of the first pumps regulated by control pressure and circuit pressure, and a second port where pressure at the outlet of the second pump is regulated by control pressure and circuit pressure;

a source of bypass clutch control pressure;

a clutch apply line and clutch release line; and a bypass clutch valve means connected to the exit line, circuit, source of bypass clutch control pressure, clutch apply line, and clutch release line, responsive to bypass clutch control pressure for connecting the exit line to the clutch release line and for alternately connecting the circuit to the clutch apply line.

11. The system of claim 10, further comprising:

a feed select valve means connected to the inlets and outlets, responsive to a difference in pressure at the outlets of the first and second pumps, for connecting the outlet of the first pump to the inlet of the second pump when the pressure at the outlet of the first pump is relatively low, and for connecting the inlet of the first pump to the inlet of the second pump when the pressure at the outlet of the first pump is relatively high.

12. The system of claim 10, further comprising:

lubrication line means for connecting the bypass clutch valve and a lube circuit; and the bypass clutch valve including means for connecting the lubrication line means and clutch apply line when the bypass clutch valve connects the exit line to the clutch release line.

13. The system of claim 12, wherein the lubrication line means further comprises:

first lubrication lines arranged mutually in parallel;

a second lubrication line arranged in parallel with the first lubrication lines, connected to an oil cooler that is connected by the second lubrication line to a lube circuit.

14. The system of claim 10, further comprising:

lubrication line means connected to the bypass clutch valve and a lube circuit; and the bypass clutch valve including means for connecting the lubrication line means and the exit line when the bypass clutch valve connects the circuit to the clutch apply line.

15. The system of claim 14, wherein the lubrication line means further comprises:

first lubrication lines arranged mutually in parallel;

a second lubrication line arranged in parallel with the first lubrication lines, connected to an oil cooler that is connected by the second lubrication line to a lube circuit.

* * * * *